United States Patent [19]
Schmidt et al.

[11] Patent Number: 5,704,107
[45] Date of Patent: Jan. 6, 1998

[54] REFRIGERATOR DOOR CONSTRUCTION

[75] Inventors: Christopher G. Schmidt, Evansville; Michael H. Fisher, Princeton, both of Ind.; Amilton Francisco de Almeida; Edson Takayuki Tani, both of Sao Paulo, Brazil

[73] Assignee: Whirlpool Corporation, Benton Harbor, Mich.

[21] Appl. No.: 719,504

[22] Filed: Sep. 25, 1996

Related U.S. Application Data

[62] Division of Ser. No. 503,358, Jul. 17, 1995, Pat. No. 5,588,731.

[51] Int. Cl.⁶ .............. B23P 19/04; A47B 96/04; B29C 65/00
[52] U.S. Cl. .............. 29/460; 312/406; 52/784.15; 264/46.5
[58] Field of Search ............... 29/460, 527.1; 312/401, 405, 406; 49/501; 52/742.11, 784.15, 794.11, 784.13, 784.12, 717.01, 717.03, 717.05; 264/46.5, 46.6, 46.7

[56] References Cited

U.S. PATENT DOCUMENTS

| | | |
|---|---|---|
| 3,359,053 | 12/1967 | Hagendoorn ............... 49/478.1 |
| 4,006,947 | 2/1977 | Haag et al. ............... 312/406 |
| 4,053,972 | 10/1977 | Kordes . |
| 4,441,301 | 4/1984 | Benson ............... 52/784.13 |
| 4,586,348 | 5/1986 | Nakayama et al. ............... 29/460 |
| 4,771,532 | 9/1988 | Taylor, Jr. et al. ............... 29/460 |
| 4,862,577 | 9/1989 | Cordill et al. ............... 29/527.1 |
| 5,033,182 | 7/1991 | Winterheimer et al. ............... 29/527.1 |
| 5,049,346 | 9/1991 | Yada et al. ............... 29/460 |
| 5,193,264 | 3/1993 | Brown ............... 264/46.5 |
| 5,369,901 | 12/1994 | Revlett ............... 49/501 |
| 5,533,311 | 7/1996 | Tirrell et al. ............... 52/784.15 |

Primary Examiner—David P. Bryant
Assistant Examiner—Tisa Stewart
Attorney, Agent, or Firm—Thomas J. Roth; Mark A. Davis; Robert O. Rice

[57] ABSTRACT

An insulated door for a refrigerator or other appliance having an external panel of an open box configuration without integrally molded inwardly directed flange portions, a plurality of separately installed trim pieces arranged around an edge perimeter of the external panel, the trim pieces having a socket region for snap engagement with the edge of the external panel, and a flange portion extending therefrom inwardly. An inside liner is applied over the trim pieces and a gasket is applied around the edge of the inside liner captured between the inside liner and the trim pieces. The invention allows for the economical molding of the external panel and the assembly of the inside liner and gasket to the external panel before a foamed-in place operation to apply the inside insulation which will unitize the structure.

3 Claims, 3 Drawing Sheets

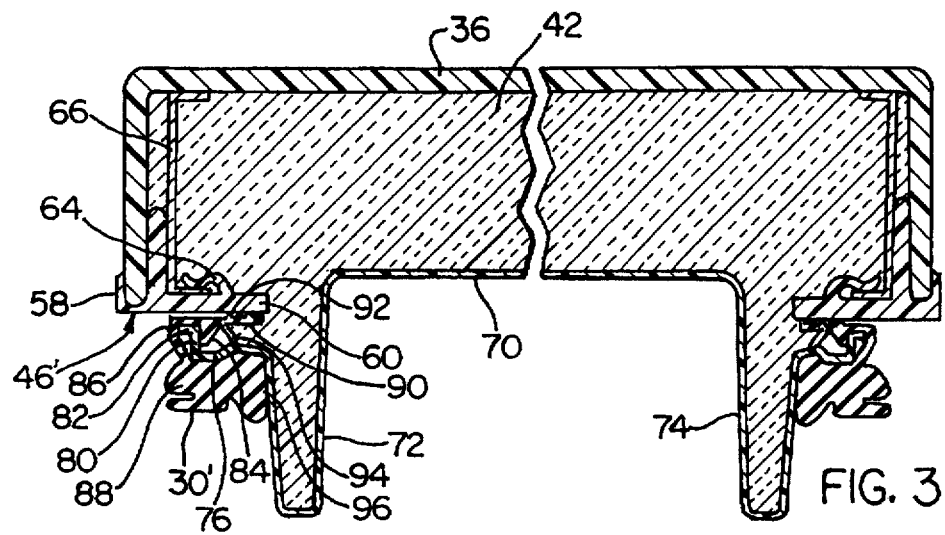
FIG. 3
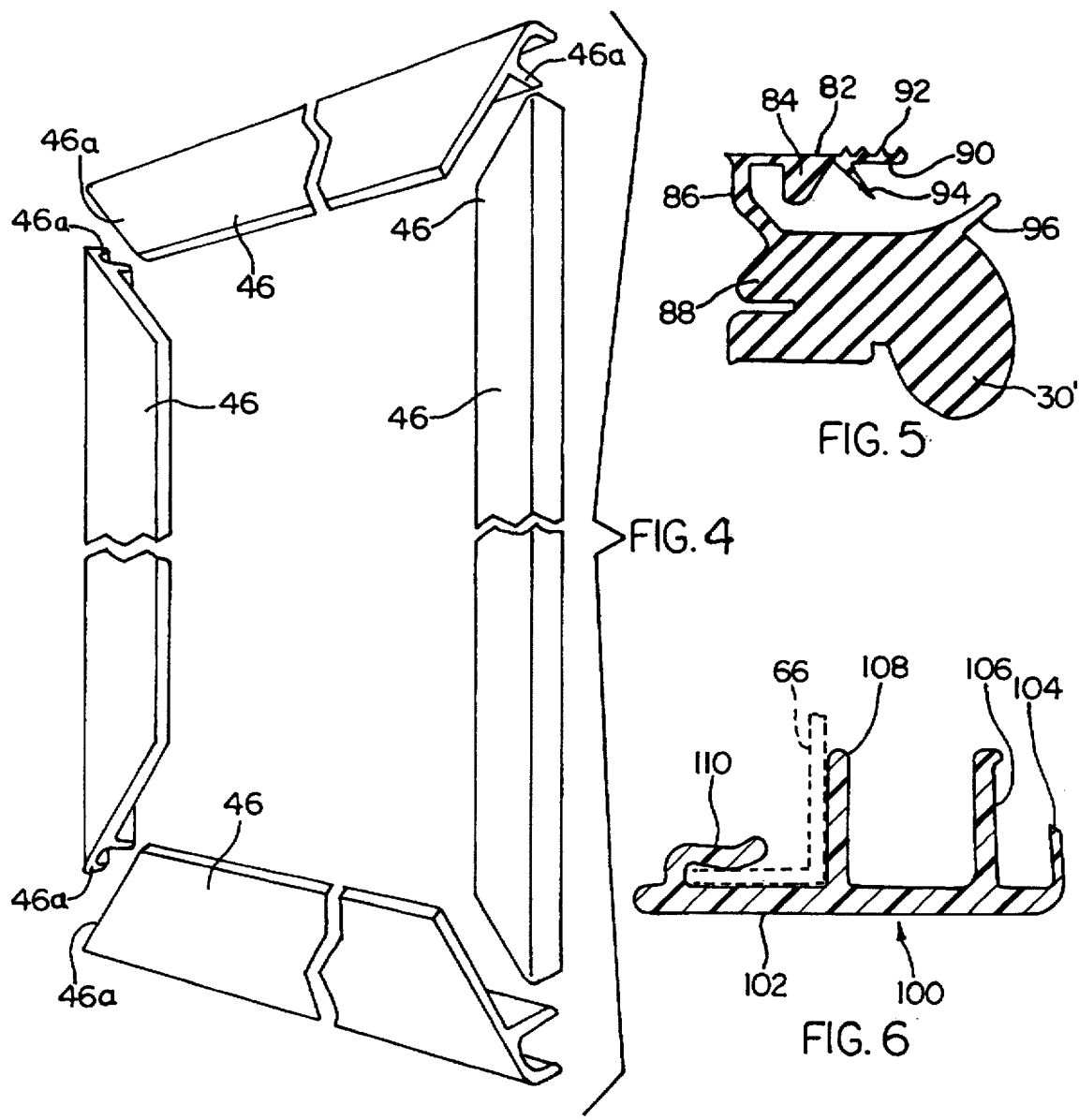
FIG. 4
FIG. 5
FIG. 6

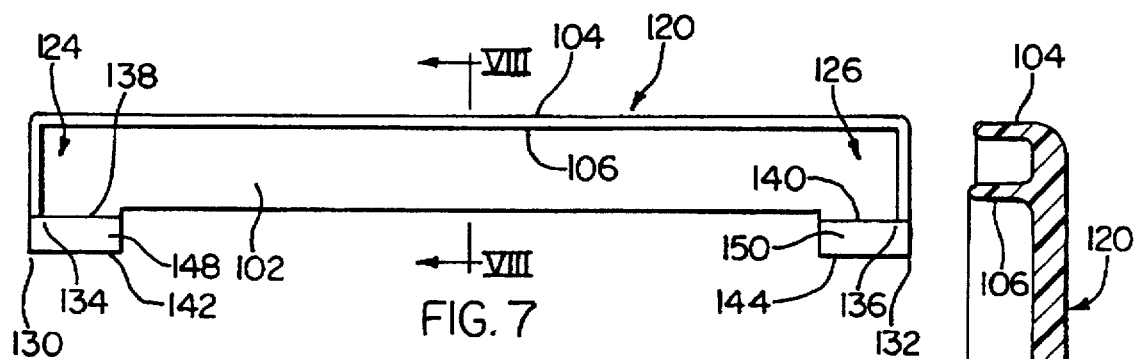
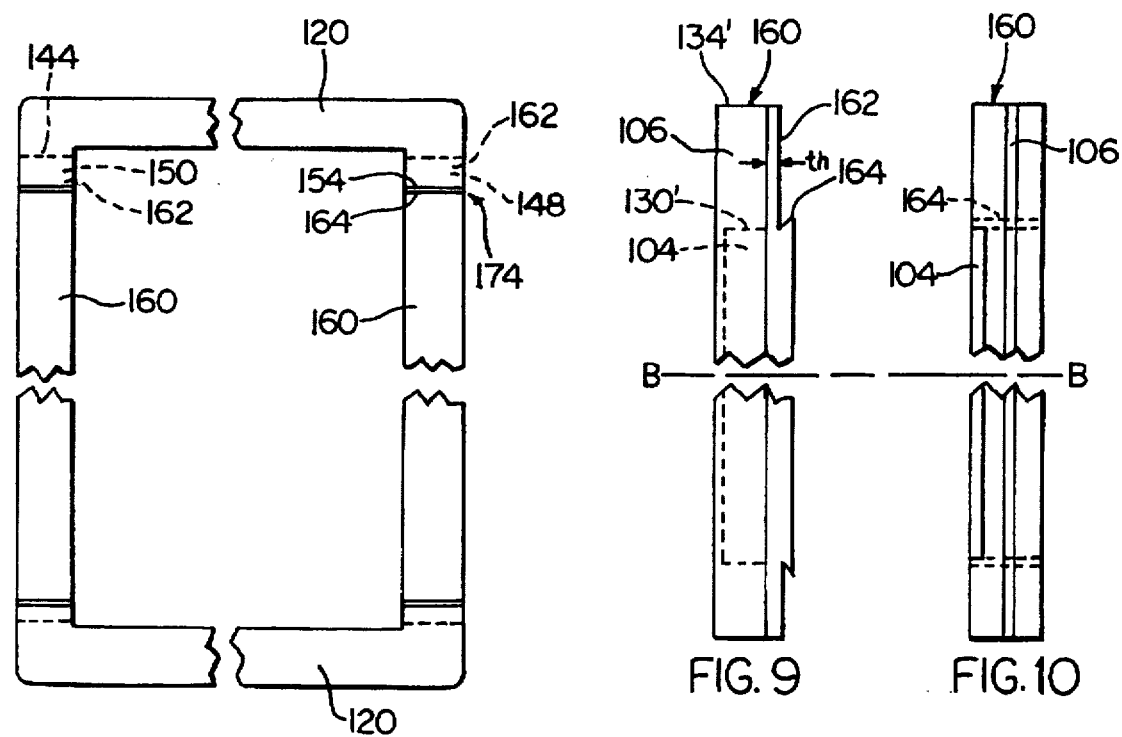

5,704,107

1

REFRIGERATOR DOOR CONSTRUCTION

This is a division of application Ser. No. 08/503,358, filed Jul. 17, 1995, U.S. Pat. No. 5,588,731.

BACKGROUND OF THE INVENTION

Refrigerators, freezers and other insulated cabinets are typically provided with insulated doors. These doors are usually constructed of an outer panel and an inner liner with a foam insulation between them. There are many possibilities of the type of materials used for the door panels and the method in which they are assembled and insulated. The most typical construction involves a metal fabricated exterior door shell that is formed with rear flanges on the back side to support and possibly attach a thermoformed plastic interior panel, as well as to support an extruded plastic gasket with internal magnet to seal against the cabinet. The typical insulation material is usually a polyurethane foam which is introduced into the door in three basic approaches: laminated in the exterior shell up to the rear flanges, injected into a small opening of a pre-assembled door, or poured into one half of the door assembly and foamed-in-place (FIP) when the outer door half is clamped down before the foam begins to expand and cure.

There are several other ways to provide a door assembly design to either reduce manufacturing complexity, improve the energy performance, improve the quality of the sealing to the cabinet, or create a unique appearance for the eye of the customer. One example of a different design approach is detailed in U.S. Pat. No. 4,053,972. It discloses special S-shaped metal retainer strips to interconnect the exterior and interior panels during the injection foaming process. However, it is apparent that the exterior door shell is still a basic metal shell which incorporates a formed rear flange (18) to attach the S-strips. U.S. Pat. No. 5,306,082 discloses a blow-molded plastic door construction for the exterior and interior panels combined, which requires an injection foaming process. Although this approach eliminates the need for a rear flange, there are many additional concerns, such as the method of attaching the gasket seal, trimming the blow-molded edges for customer appeal, limited details for attachment of interior shelves, and the effects of thermal bow due to the temperature differential between the inside and outside of the door assembly, to name a few.

SUMMARY OF THE INVENTION

It is an object of the present invention to provide a new refrigerator or freezer door construction which utilizes snap-on rear flanges for a plastic exterior door shell. By using separate parts for the rear flange, it is an object of the invention to have an exterior door shell that can be easily molded out of a plastic material without complex and costly camming of a forming tool for the rear flanges. The rear flanges will provide a surface for supporting the interior panel during the foamed-in-place insulation process without the need for fastening to the exterior panel.

The snap-on rear flanges can be constructed as a one-piece frame or separated parts for the sides, top, and bottom of the doors. They snap onto the periphery of the exterior door shell that can be inventively and easily molded into an "open box" shape using a rigid polyurethane plastic material such as described in U.S. Pat. No. 4,927,861, herein incorporated by reference.

The rear flanges comprise a rigid PVC plastic material that are constructed into an "F" shaped cross section with a snap-on trough. The trough snaps onto the exposed edge periphery of the exterior panel.

2

The rear flanges can also include an elongate retaining clip extruded into the part. A steel C-channel or other reinforcing member can be assembled into this clip to reduce thermal bow and/or rack distortion of the door assembly due to excessive operating forces.

After the rear flanges have been attached to the exterior door shell, the normal foamed-in-place insulation process can be utilized for joining with the interior panel. The gasket can be pre-installed to the inner panel before foaming and act as the seal against the rear flanges to prevent outward egress of foam.

A method of assembling a refrigerator door is provided in that the external panel is premolded having an open box shape without inward protrusions at its open face to ease removal from the mold, i.e., no camming required, and the trim pieces can be snapped in place around the open face. The inner liner can be premolded with the gasket held thereto. The external panel and the inner liner are then mated together in a mold and the foam insulation is placed between the two pieces to form a unitary rigid structure.

BRIEF DESCRIPTION OF THE DRAWINGS

FIG. 3 is a sectional view of an alternate embodiment of the present invention;

FIG. 4 is an exploded perspective view of the trim piece assembly of the present invention;

FIG. 5 is a sectional view of the gasket shown in FIG. 3, shown in a relaxed state;

FIG. 6 is a cross section of a further alternate embodiment of the rear flange of FIG. 2;

FIG. 7 is a front view of an alternate embodiment of a top rear flange of FIG. 4;

FIG. 8 is a sectional view taken generally along line VIII—VIII of FIG. 7 of the rear flange of FIG. 7;

FIG. 9 is a side view of an alternate embodiment of a side rear flange of FIG. 4;

FIG. 10 is a front view of the rear flange of FIG. 9; and

FIG. 11 is a rear view of a trim piece assembly using the pieces of FIGS. 7–10.

DETAILED DESCRIPTION OF THE PREFERRED EMBODIMENTS

Figure 1:
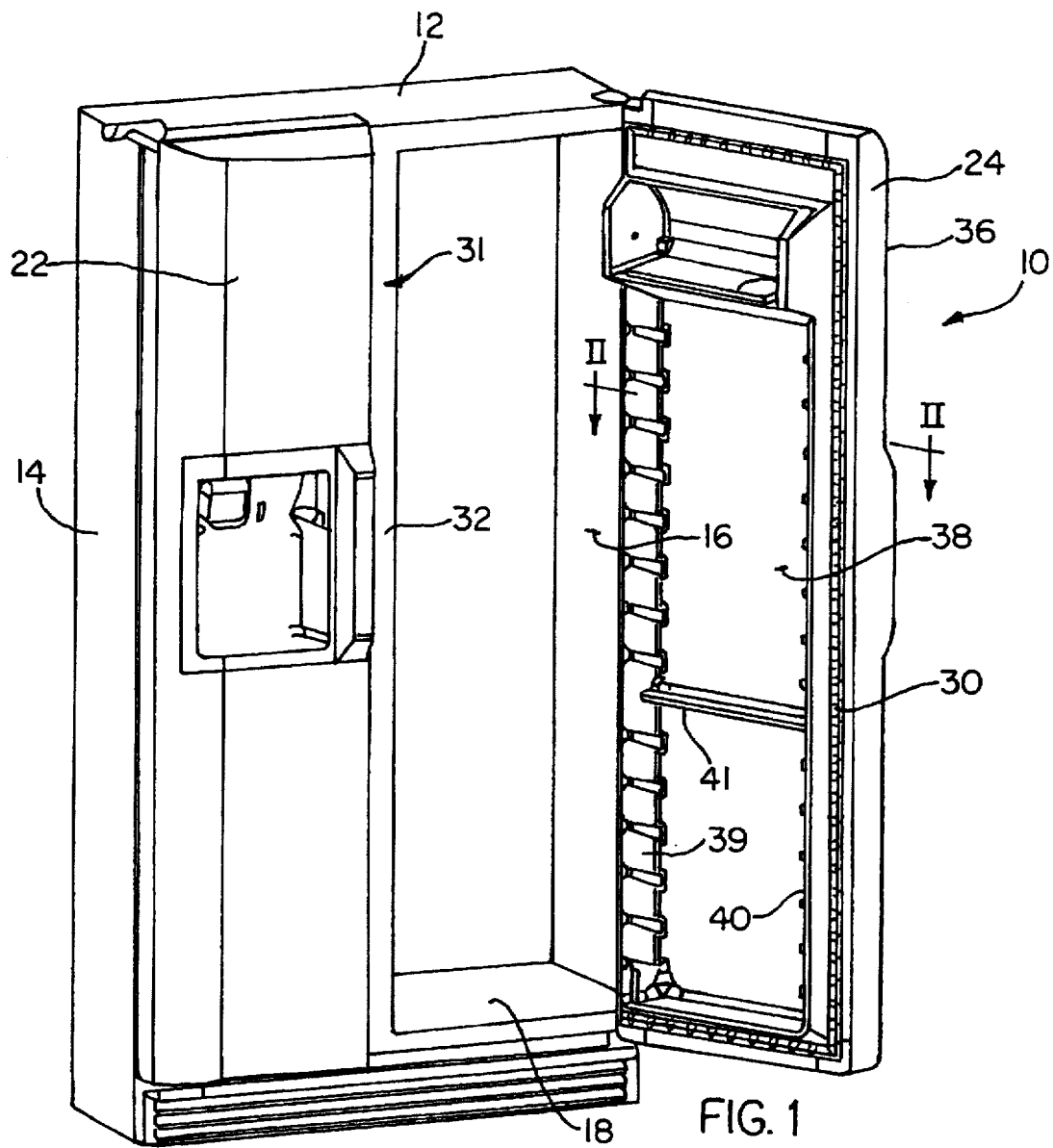
FIG. 1 is a perspective view of a refrigerator/freezer illustrating the door construction of the present invention.

FIG. 1 illustrates a refrigerator/freezer 10 having a top wall 12, a left side wall 14, right side wall 16, a bottom 18 and a back 20 forming an open box closed by doors 22, 24. A gasket 30, preferably an elastomeric material, surrounds a perimeter of the door 24 and seals against a front surface 31 adjacent the top wall 12, left side wall 14, bottom 18 and a center partition wall 32. The door 24 is constructed of an outer panel 36 and inner liner 38. The inner liner 38 provides vertical columns 39, 40 for supporting shelves 41 and for increasing structural strength of the door. The construction of the door is more clearly indicated in FIG. 2. Although the door structure and gasketing is described with respect to the refrigerator door 24, a substantially identical structure is used for the freezer door 22.

Figure 2:
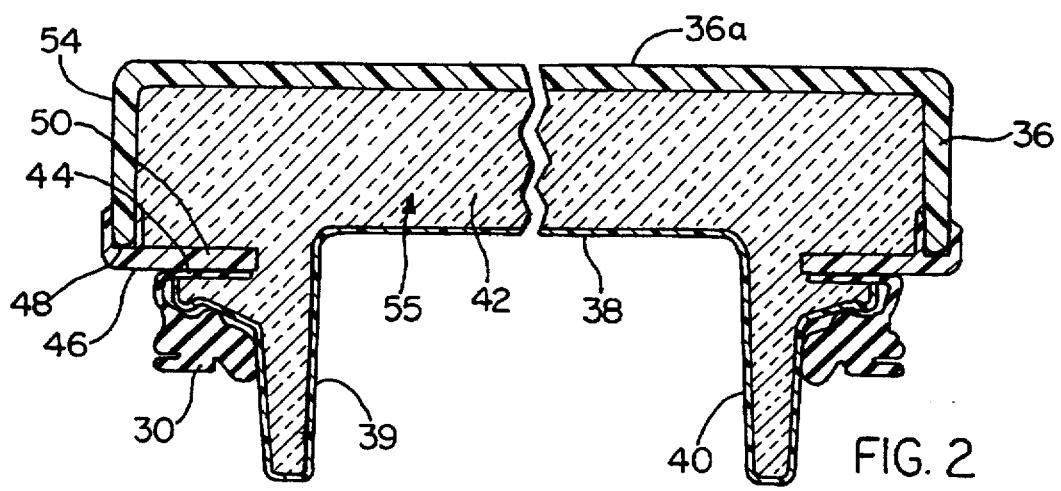
FIG. 2 is a partial sectional view taken generally along line II—II of FIG. 1.

FIG. 2 illustrates the external panel 36 and the interior liner 38 in facing relationship and a foam insulation 42 applied therebetween. It is understood that left and right sides of the figure are mirror images and only the left side is described in detail. The external panel and the inner liner are advantageously rigid polyurethane such as described in U.S. Pat. No. 4,927,861. Alternately, the external panel 36 can be another plastic or sheet metal. The gasket 30 provides a lip portion 44 which assembles onto the inner liner 38. A trim piece or "rear flange" 46 is approximately "F" shaped and provides a U-shaped trough region 48 extending into a flange 50 which is oriented perpendicularly to a side wall 54 of the external panel 36. During assembly, the external panel 36 and the trim piece 46 are held by a first half of a molding fixture while the inner liner 38 and the gasket 30 are held by a second half of the molding fixture. The first half of the molding fixture is pivoted downward onto the second half to align the inner liner and external panel. Once aligned, the first half of the molding fixture is pivoted up again. Liquid foaming agent such as polyurethane is poured into the inner liner 38. Then the external panel 36 and trim piece 46, are pivoted down again and clamped down onto the gasket surface before the foam begins reacting. Upon completion of foaming and curing, the gasket 30, the trim piece 46, the inner liner 38 and external panel 36 are all fused together and structurally unitized by the foam insulation.

Because the external panel 36 can be formed having a C-shaped cross section or an open box shape without the need for inwardly directed flanges to support the inner liner 38, the external panel 36 can be injection molded with easy removal from the mold. A cammed core is not required. The molded surface can be outwardly removed from the mold without interference with any inwardly directed portions. With inwardly directed flanges, the molding is more difficult and usually expensive. Thus the use of the snap-on extruded return flange trim piece for the external panel 36 simplifies the manufacturing process to produce the refrigerator door.

FIG. 3 illustrates another embodiment of the snap-on trim piece 46' wherein a clasping portion 58 is "F" shaped with a flange portion 60. The trim piece 46' also provides a longitudinally extruded clip 64 for holding a structural channel 66, such as a steel C-channel, which once foamed integrally into the door 24, gives additional strength to an otherwise all-plastic door.

An inner liner 70 shown in FIG. 3 provides column regions 72, 74 for refrigerator shelf support. The column regions 72, 74 each provide on an outside thereof, a gasket supporting flange 76 extending generally parallel to the flange portion 60. The gasket supporting flange 76 extends into a lug portion 80 which proceeds toward the flange 60 and terminates in an outwardly turned head portion 82. The head portion 82 and at least part of the lug portion 80 are used to retain an alternate gasket 30' shown in more detail in FIG. 5.

FIG. 4 illustrates a plurality of trim pieces 46 cut and arranged as a rectangle with mitre cuts 50 so that the pieces 46 fit together in a manner similar to a picture frame for installation onto an external panel 36. This creates a border trim for the external panel 36. Although the trim piece 46 of FIG. 2 is shown, the same arrangement is applicable to the alternate trim piece 46' of FIG. 3.

FIG. 5 illustrates the gasket 30' in a relaxed state. As also shown in FIGS. 3 and 5, the gasket provides a triangular wall portion 84 and an outside wall portion 86 for holding the head portion 82. The outside wall portion 86 is connected to a body 88 of the gasket 30'. The gasket 30' provides a sealing wall 90 having a plurality of teeth 92. These teeth help seal against the flange 60, especially during foaming.

FIG. 6 illustrates an alternate trim piece 100 having a flange portion 102 having a first upstanding lip 104 at a terminal thereof and a second upstanding lip 106 spaced from the first upstanding lip 104. The flange portion 102 and the upstanding lips 104, 106 conform generally to a "F" shaped as previously described. Spaced from the second upstanding lip 106 is a wall member 108 extending perpendicularly from the flange portion 102. At an end opposite the first upstanding lip 104 is an extruded clip 110.

As with the previously described embodiments, the upstanding lips 104, 106 act to clamp the trim piece 100 to the external panel 36. The clip 110 works in conjunction with the wall 108 to retain a structural member such as a C-shaped channel 66 (shown partially and in phantom).

FIGS. 7 and 8 describe a trim piece 120 for use as a bottom and top trim piece component to an assembled door. The piece 120 provides the first upstanding lip 104 and the second upstanding lip 106 as shown in FIG. 6 but in this more simple embodiment the wall member 108, and the clip 110 are not used although their use is also encompassed by the invention. The piece 120 is formed with opposite corner regions 124, 126 wherein the upstanding lips 104, 106 are turned 90°. Likewise the flange portion 102 is turned 90°. The first upstanding lip 104 extends to two positions 130, 132 respectively. The second upstanding lip 106 terminates at the positions 134, 136 respectively. Along lines 138, 140 at the points 134, 136, the flange 102 is recessed to a smaller overall thickness "t" extending to a line 142, 144 corresponding to the positions 130, 132 respectively. Rectangular recesses 148, 150 are thus formed, respectively.

As shown in FIG. 8 on a rear surface of the trim piece 120 adjacent the position 130, the flange portion 102 provides a beveled cut 154. The recess 148 is shown resulting in thickness "t"; less than a full thickness "T" of the flange 102.

FIGS. 9 and 10 show a straight trim piece 160 which is used (in a pair) to connect identical trim pieces 120 which are used at the top and bottom of the refrigerator door. The straight trim piece 160 provides a recess 162 resulting in a flange thickness "th" which, when installed to the trim piece 120, overlies the recessed rectangular region 148 and wherein the additive thickness of t and th is approximately equal to the total flange thickness T. On an end of the recess 162 is a beveled acute edge 164 which fits over the beveled surface 154 of the trim piece 120 to form a lap joint. The straight trim piece likewise provides the first upstanding lip 104 and the second upstanding lip 106 corresponding in size and alignment as the upstanding lips 104, 106 of the trim piece 120. The first upstanding lip 104 terminates at a position 130' and the second upstanding lip 106 terminates at a position 134'. The positions 130', 134' when assembled, will approach closely to the positions 130, 134. Thus, the upstanding lips 104, 106 of the two trim pieces 120, 160 will be assembled in staggered joint fashion.

The straight piece as shown in FIG. 9 and FIG. 10 is configured in mirror image fashion across line B—B to mate with a trim piece 120 arranged at a bottom of the refrigerator door.

FIG. 11 shows two trim pieces 120 connected to two straight pieces 160 in a rectangular configuration for clamping onto an edge of an external panel 36. Lap joints 174 are formed at four places at the edges 154, 164 formed between trim pieces 120, 160 respectively with the recesses 148, 150 substantially overlying the recesses 162, 162. Using this rectangular configuration of trim pieces, some differential vertical movement between the trim pieces 120, 160 allows for more easy fit up of the pieces and provides some differential thermal movement between the pieces to prevent slight misalignments between trim pieces.

Although FIG. 4 and FIG. 11 describe trim piece assemblies using separate trim pieces, it is also within the scope of the invention to provide a single rectangular trim piece for snapping onto surrounding edges of an external panel 36 to provide a rear flange for the molding of an interior panel thereon.

Although the present invention has been described with reference to a specific embodiment, those of skill in the art will recognize that changes may be made thereto without departing from the scope and spirit of the invention as set forth in the appended claims.

We claim as our invention:

1. A method of assembling a refrigerator door comprising the sequential steps of:

molding an external panel having an open box shape;

molding an inside liner having an open box shape;

placing a border trim onto an open face of the external panel;

placing a gasket around an open face of the inside liner;

foaming insulation placed between said external panel and said inside liner;

clamping together said external panel and said inside liner, with said inside liner held closely to said border trim; and curing said insulation to hold said external panel, inside liner, border trim and gasket together as a single unit without additional fasteners.

2. The method according to claim 1, wherein said step of molding said inside liner further comprises a step of providing a gasket supporting flange, and said gasket comprises a body portion arranged on said supporting flange facing outwardly and a curled portion extending around said supporting flange to be captured between said border trim and said supporting flange during said step of clamping together said external panel and said inside liner.

3. The method of claim 1, further comprising placing an elongate structural member between said external panel and said border trim prior to clamping said external panel to said inside liner.

* * * * *